United States Patent
Yamaura

(10) Patent No.: US 10,522,867 B2
(45) Date of Patent: Dec. 31, 2019

(54) END PLATE FOR A FUEL CELL

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 58 days.

(21) Appl. No.: 15/604,777

(22) Filed: May 25, 2017

(65) Prior Publication Data
US 2017/0352906 A1    Dec. 7, 2017

(30) Foreign Application Priority Data

Jun. 3, 2016 (JP) ................................ 2016-111820

(51) Int. Cl.
*H01M 8/2484* (2016.01)
*H01M 8/0273* (2016.01)
*H01M 8/0254* (2016.01)

(52) U.S. Cl.
CPC ....... *H01M 8/2484* (2016.02); *H01M 8/0254* (2013.01); *H01M 8/0273* (2013.01)

(58) Field of Classification Search
CPC ............. H01M 8/0273; H01M 8/0271; H01M 8/2483; H01M 8/0202; H01M 8/2465; H01M 8/0247; H01M 2008/1095; H01M 8/2484; H01M 8/0254; C25B 9/203
See application file for complete search history.

(56) References Cited

U.S. PATENT DOCUMENTS

| | | | |
|---|---|---|---|
| 2008/0134592 A1* | 6/2008 | Reaveley | E04H 9/02 52/167.8 |
| 2016/0181624 A1* | 6/2016 | Brandner | C22C 32/0026 429/508 |

FOREIGN PATENT DOCUMENTS

| JP | 2004-27562 | 1/2004 |
|---|---|---|
| JP | 5313548 | 7/2013 |
| JP | 2015-95321 | 5/2015 |

OTHER PUBLICATIONS

Machine translation of JP 2015-095321, "Fuel Cell", Hotta et al. (Year: 2015).*

(Continued)

*Primary Examiner* — Maria Laios
*Assistant Examiner* — Kwang Han
(74) *Attorney, Agent, or Firm* — Greenblum & Bernstein, P.L.C.

(57) ABSTRACT

An end plate includes a plate body, fastening portions, and ribs. The plate body is rectangular and includes two long sides and two short sides. The plate body is arranged on an end of a cell stack of a fuel cell. The fastening portions are fastened to a case containing the cell stack. The fastening portions extend along edges of the plate body. The ribs are arranged in a grid-like manner on the plate body surrounded by the fastening portions. The ribs are arranged so that recesses defined between the ribs each have a quadrilateral shape in which two diagonals have different lengths. The ribs are arranged so that the recesses extend in a direction in which the ribs extend and so that a longer one of the two diagonals of each of the recesses extends parallel to the short sides of the plate body.

4 Claims, 3 Drawing Sheets

(56) References Cited

OTHER PUBLICATIONS

Office Action issued in Japan Counterpart Patent Appl. No. 2016-111820, dated May 28, 2019.
Design of Die Castings, Die casting technical committee, translation, dated Apr. 25, 1959. pp. 75-78, together with a partial English translation, dated Apr. 25, 1959.

* cited by examiner

END PLATE FOR A FUEL CELL

BACKGROUND OF THE INVENTION

The present invention relates to an end plate arranged on an end of a cell stack of a fuel cell in a direction in which cells are stacked.

An end plate of a fuel cell includes a plate body and fastening portions. The plate body has the form of a rectangular plate that includes two long sides and two short sides. The fastening portions are located on the edges of the plate body. The fastening portions are fastened to a case that contains a cell stack of the fuel cell. When the fastening portions of the plate body are fastened to the case, the plate body (end plate) presses the cell stack in the direction in which cells are stacked and keeps the cells stacked. When pressing the cell stack as described above, the end plate receives a reaction force from the cell stack.

There is a demand for a method that manufactures the end plate with high productivity. To meet the demand, a die casting process may be employed to charge molten metal under high pressure into a mold. In such a die casting process, the molten metal is charged into the mold almost at the same time as when gas is completely discharged from the mold. This may form voids (hollow portions) in the manufactured end plate if the manufactured end plate is thick.

As described in Japanese Laid-Open Patent Publication No. 2015-95321 and Japanese Patent No. 5313548, thickness-reducing recesses and reinforcement ribs may be arranged at a portion of the plate body surrounded by the fastening portions to reduce the thickness of the end plate while obtaining the strength required for the end plate. The recesses are formed by removing material in the thicknesswise direction from the plate body. The formation of the recesses in the plate body forms the ribs between adjacent ones of the recesses. The recesses and ribs of the plate body reduce the thickness of the end plate while obtaining the strength required for the end plate.

In Japanese Patent Publication No. 2015-95321, the recesses have triangular or quadrilateral cross-sections in a plan view and are irregularly arranged. Thus, the ribs formed between adjacent ones of the recesses extend in different directions. In Japanese Patent No. 5313548, the recesses have quadrilateral cross-sections in a plan view and are regularly arranged parallel to the short sides and the long sides of the plate body. The ribs formed between adjacent ones of the recesses extend parallel to the long sides and the short sides of the plate body. Thus, the ribs are arranged in a grid-like manner.

When fastening the fastening portions of the plate body to the case, the end plate presses the cell stack to keep the cells stacked. Thus, the end plate receives reaction force from the cell stack, and stress resulting from the reaction force acts on the end plate.

When employing recesses and ribs such as those of Japanese Laid-Open Patent Publication No. 2015-95321, the ribs will extend in different directions. Thus, when stress resulting from the cell stack acts on the end plate, the amount of stress acting on the ribs will differ between ribs. In such a case, stress will be concentrated on a rib that is arranged at a certain location. When stress is concentrated on a rib arranged at a certain location, the durability at such a location may be adversely affected.

When employing recesses and ribs such as those of Japanese Patent Publication No. 5313548, the ribs extending parallel to the long sides and short sides of the plate body will be arranged in a grid-like manner. In this case, when the end plate receives reaction force from the cell stage and stress acts on the end plate, a small stress acts on the ribs extending parallel to the long sides, while a large stress acts on the ribs extending parallel to the short sides. The factors causing stress to act in such a manner will now be described.

The two ends of each rib that extend parallel to the longs sides of the plate body are located in the proximity of the fastening portions of the plate body. Further, the distance is long between the two ends of such a rib. Thus, the ribs extending parallel to the long sides easily deform when receiving a reaction force. This decreases the stress acting on such ribs resulting from the reaction force. The two ends of each rib that extend parallel to the short sides of the plate body are also located in the proximity of the fastening portions of the plate body. However, the distance is short between the two ends of such a rib. Thus, the ribs extending parallel to the short sides resist deformation when receiving a reaction force. This increases the stress acting on such ribs resulting from the reaction force.

Accordingly, when employing recesses and ribs such as those of Japanese Patent Publication No. 5313548, stress is easily concentrated at certain locations in the ribs extending parallel to the short sides. This may adversely affect the durability at such locations.

SUMMARY OF THE INVENTION

It is an object of the present invention to provide an end plate that limits the concentration of stress at a certain rib when the end plate receives a reaction force from a cell stack and the amount of stress resulting from the reaction force and acting on ribs differs between the ribs.

To achieve the above object, an end plate according to one aspect of the present invention includes a plate body, a fastening portion, and ribs. The plate body has the form of a rectangular plate including two long sides and two short sides. The plate body is arranged on an end of a cell stack of a fuel cell in a direction in which cells are stacked. The fastening portion extends along edges of the plate body. The fastening portion is fastened to a case that contains the cell stack. The ribs are arranged in a grid-like manner in a region of the plate body surrounded by the fastening portion. The ribs are arranged so that recesses defined between the ribs each have a quadrilateral shape in a cross-sectional plan view in which two diagonals have different lengths. The ribs are arranged so that the recesses extend in a direction in which the ribs extend. The ribs are arranged so that a longer one of the two diagonals of each of the recesses extends parallel to the short sides of the plate body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of an end plate will now be described with reference to FIGS. 1 to 4.

Figure 1:
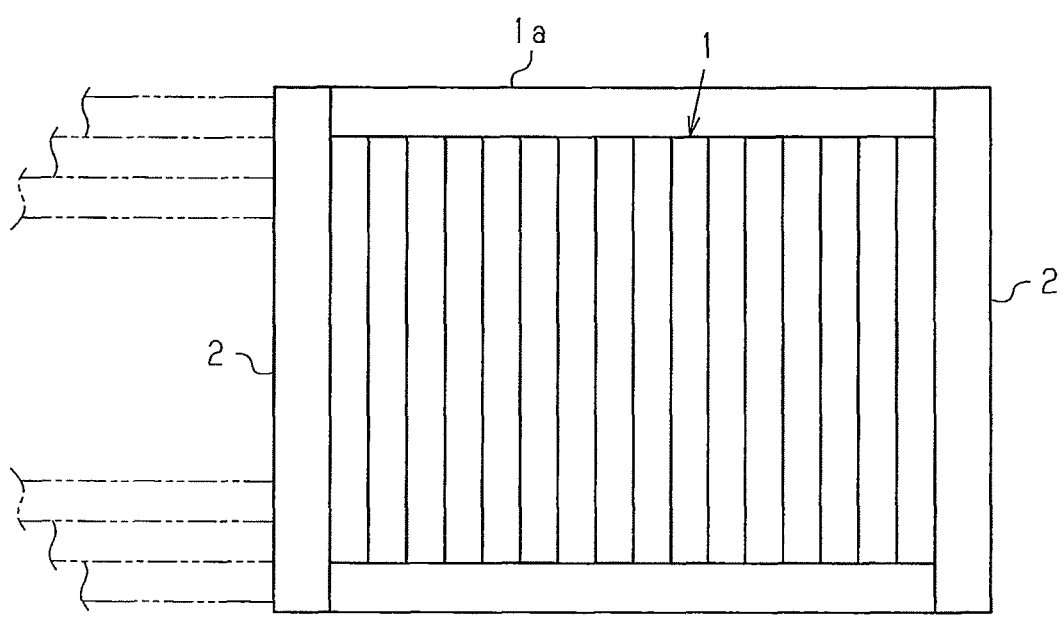
FIG. 1 is a schematic diagram showing an end plate coupled to a cell stack of a fuel cell.

As shown in FIG. 1 a fuel cell includes a cell stack. An end plate 2 is arranged on each end of the cell stack 1 in the direction in which cells are stacked (lateral direction in FIG. 1). The end plates 2 are manufactured in a die casting process. One of the end plates 2 (in this example, left one in FIG. 1) functions as a manifold that supplies and discharges the cell stack 1 with fluid such as hydrogen (fuel gas), air (oxidation gas), and coolant (cooling liquid). The cell stack 1 uses the hydrogen and air supplied and discharged through the end plate 2 (manifold) to generate electric power. Further, the coolant supplied and discharged through the end plate 2 (manifold) cools the cell stack 1.

Figure 2:
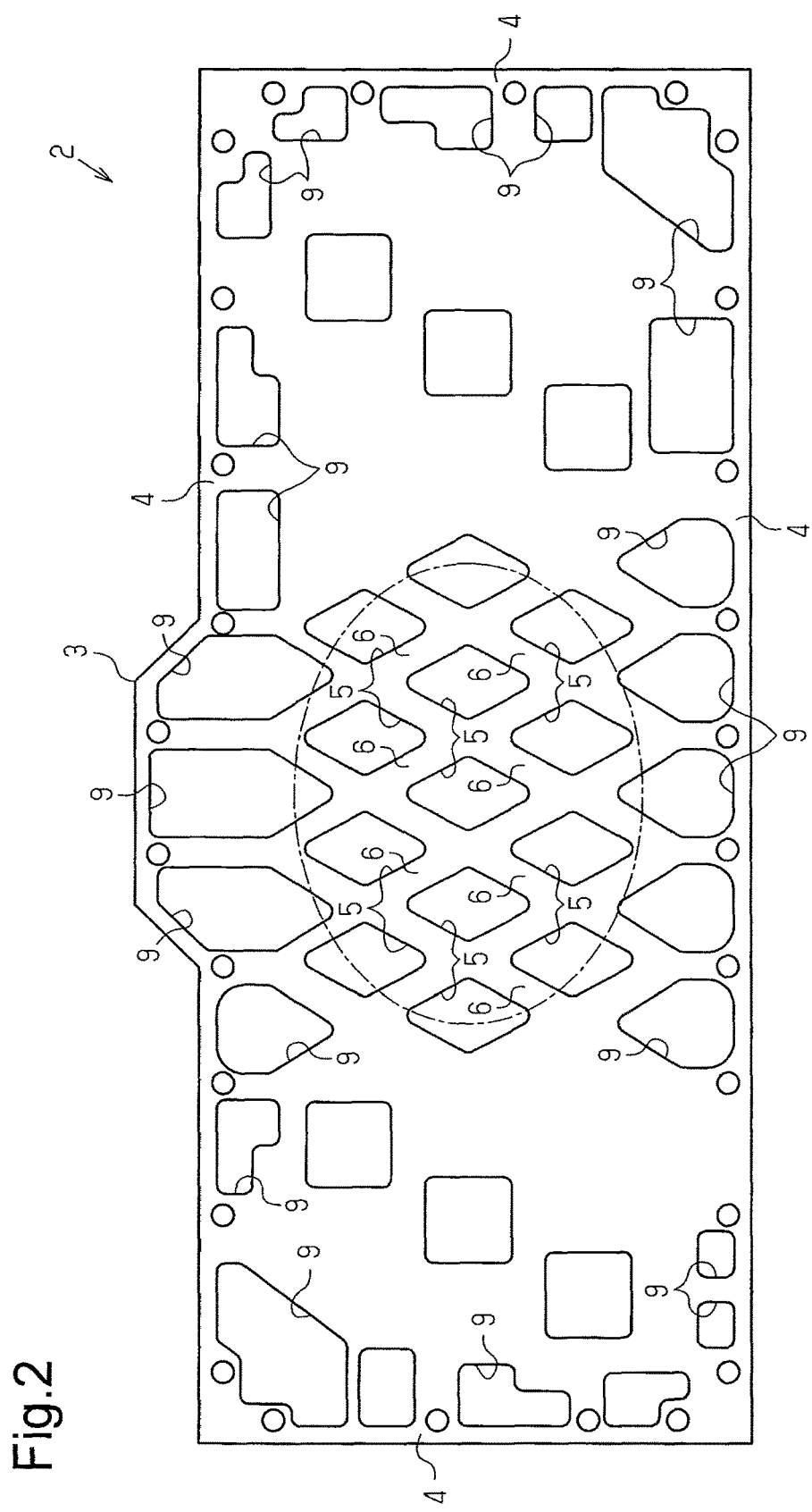
FIG. 2 is a plan view of the end plate shown in FIG. 1.

As shown in FIG. 2, each end plate 2 includes a plate body 3 and fastening portions 4. The plate body 3 has the form of a rectangular plate including two long sides and two short sides. The fastening portions 4 extend along the edges of the plate body 3 and are fastened to a case 1a containing the cell stack 1 (FIG. 1). The fastening portions 4 extend along the two long sides and the two short sides of the plate body 3.

The fastening portions 4 that extend in the direction parallel to the long sides of the plate body 3 are fastened to the case 1a of the cell stack 1 by bolts or the like that are arranged at predetermined intervals in the direction parallel to the long sides of the plate body 3. The fastening portions 4 that extend in the direction parallel to the short sides of the plate body 3 are fastened to the case 1a of the cell stack 1 by bolts or the like that are arranged at predetermined intervals in the direction parallel to the short sides of the plate body 3.

As described above, when the fastening portions 4 of the plate body 3 are fastened to the case 1a of the cell stack 1, the end plate 2 presses the cell stack 1 in the direction in which cells are stacked (cell stacking direction) to keep the cells stacked in the cell stack 1. As described above, when the end plate 2 presses the cell stack 1, the end plate 2 receives reaction force from the cell stack 1.

The end plate 2 is manufactured through a die casting process and thus needs to be thin. Nevertheless, the end plate 2 needs to have a certain level of strength. Thus, the region of the plate body 3 surrounded by the fastening portions 4 includes recesses 5 and reinforcement ribs 6. The recesses 5 are formed by removing material from the plate body 3 in the thickness-wise direction (direction orthogonal to a plane of FIG. 2). The formation of the recesses 5 in the plate body 3 forms the ribs 6 between adjacent ones of the recesses 5. The recesses 5 and the ribs 6 of the plate body 3 reduce the thickness of the end plate 2 and obtain the strength required for the end plate 2.

In addition to the recesses 5 surrounded by the ribs 6, the plate body 3 of the end plate 2 includes material-removed recesses 9. In the same manner as the recesses 5, the recesses 9 are formed by removing material from the plate body 3 in the thickness-wise direction.

The shapes of the recesses 5 and the ribs 6 will now be described in detail.

Figure 3:
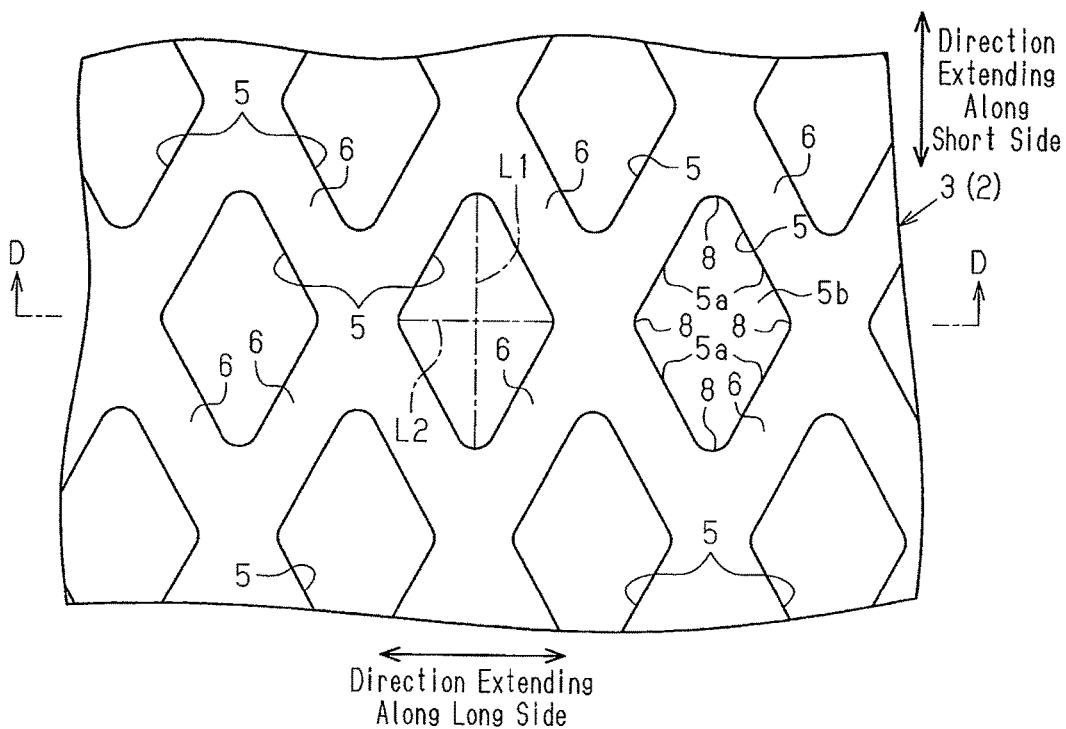
FIG. 3 is an enlarged view of a portion surrounded by fastening portions in a plate body shown in FIG. 2.

FIG. 3 is an enlarged view of the region surrounded by the fastening portions 4 in the plate body 3 shown in FIG. 2, in particular, the region within the double-dashed line in FIG. 2. As shown in FIG. 3, the ribs 6 are inclined relative to the directions parallel to the long and short sides of the plate body 3 and are arranged in a grid-like manner. Further, the ribs 6 are formed to satisfy conditions (A) to (C).

(A) The recesses 5 surrounded by the ribs 6 each have a quadrilateral (rhomboid) cross-section in a plan view in which two diagonals L1 and L2 have different lengths.

(B) The recesses 5 surrounded by the ribs 6 are successively arranged, spaced apart from one another, in the direction in which the ribs 6 extend.

(C) Among the two diagonals L1 and L2 of each recess 5 surrounded by the corresponding ribs 6, the longer diagonal L1 extends parallel to the short side of the plate body 3. In this example, the diagonal L1 extends in the direction parallel to the short sides of the plate body 3. Further, the diagonal L2 extends in the direction parallel to the long sides of the plate body 3.

Figure 4:
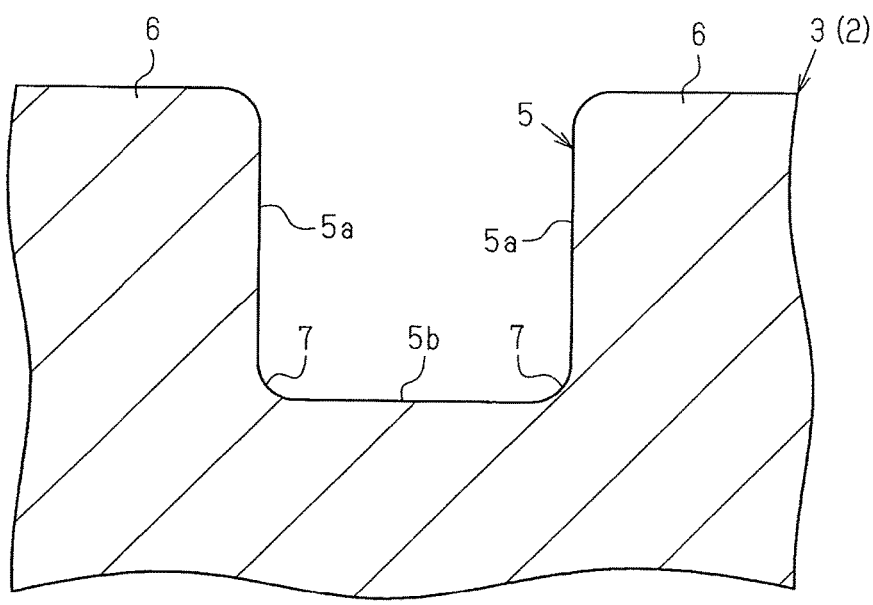
FIG. 4 is a cross-sectional view taken along line D-D in FIG. 3 showing a recess of the plate body.

FIG. 4 is a cross-sectional view of one of the recesses 5 in the plate body 3 taken along line D-D in FIG. 3. As shown in FIG. 4, each recess 5 has an open end with an obtuse edge so that the recess 5 widens as a distance from the bottom of the recess 5 becomes longer. In this example, the edge is rounded. The recess 5 includes wall surfaces 5a and a bottom surface 5b that are connected by curved surfaces 7, which are curved in an arcuate manner. Further, as shown in FIG. 3, the adjacent wall surfaces 5a in each recess 5 are connected by curved surfaces 8, which are curved in an arcuate manner.

The operation of the end plate 2 will now be described.

In the end plate 2, the ribs 6, which are formed between the adjacent recesses 5 and arranged in a grid-like manner, are inclined relative to the directions parallel to the long and short sides of the plate body 3. Further, the recesses 5 are regularly arranged. The two ends of each rib 6 are located in the proximity of the fastening portions 4 of the plate body 3, and the distance between the two ends of each rib 6 decreases as the inclination of the rib 6 relative to the direction parallel to the short sides of the plate body 3 decreases (inclination of rib 6 relative to direction parallel to long sides of plate body 3 increases). A decrease in the distance between the two ends of each rib 6 reduces deformation of the rib 6 when the plate body 3 receives a reaction force from the cell stack 1 and increases the stress that acts on the ribs 6.

The ribs 6 surrounded by the corresponding recesses 5 in the plate body 3 are formed in a manner setting the inclination of each rib 6, which has a quadrilateral cross section in a plan view, so that among the two diagonals L1 and L2 of each recess 5, the longer diagonal L1 extends parallel to the short side of the plate body 3. The inclination of each rib 6 (corresponding to distance between the two ends of each rib 6) is set to restrict excessive deformation of the rib 6 when a reaction force is received and increase the stress applied to the rib 6 by a certain degree. With regard to the stress that acts on each rib 6, the ribs 6 are regularly arranged in a state inclined relative to the direction parallel to the short sides of the plate body 3. This reduces differences in the stress acting on each rib 6.

The present embodiment has the advantages described below.

(1) The concentration of stress on certain ribs 6 is limited. Stress is concentrated when the end plate 2 receives a reaction force from the cell stack 1 and the stress resulting from the reaction force acts differently on the ribs 6. Since stress is not concentrated on certain ribs 6, problems related with durability that would arise at such locations do not occur.

(2) The edge of the open end of each recess 5 in the plate body 3 is blunt so that the recess 5 widens as a distance from the bottom of the recess 5 becomes longer. This reduces the stress that concentrates at the open end of each recess 5 when the plate body 3 (end plate 2) receives a reaction force from the cell stack 1.

(3) Among the wall surfaces 5a of each recess 5 in the plate body 3, the adjacent wall surfaces 5a are connected by the curved surfaces 8 that are curved in an arcuate manner. This reduces the stress that concentrates at the portion (curved surfaces 8) connecting the adjacent wall surfaces 5a when the plate body 3 (end plate 2) receives a reaction force from the cell stack 1.

(4) The inner wall surfaces 5a and the bottom surface 5b of each recess 5 in the plate body 3 are connected by the curved surface 7 that is curved in an arcuate manner. This reduces the stress that concentrates at the portion (curved surfaces 7) connecting the wall surfaces 5a and the bottom surface 5b in each recess 5 when the plate body 3 (end plate 2) receives a reaction force from the cell stack 1.

It should be apparent to those skilled in the art that the present invention may be embodied in many other specific forms without departing from the spirit or scope of the invention. Particularly, it should be understood that the present invention may be embodied in the following forms.

The edges at the open end of each recess 5 do not have to be rounded and may be chamfered.

The edges at the open end of each recess 5 do not necessarily have to be blunt.

The recesses 5 do not necessarily have to include the curved surfaces 8.

The recesses 5 do not necessarily have to include the curved surfaces 7.

The diagonal L1 of each recess 5 does not necessarily have to extend parallel to the short sides of the plate body 3 and may be inclined by a certain amount relative to the short sides.

The present examples and embodiments are to be considered as illustrative and not restrictive, and the invention is not to be limited to the details given herein, but may be modified within the scope and equivalence of the appended claims.

The invention claimed is:

1. An end plate comprising:
   a plate body having the form of a rectangular plate including two long sides and two short sides, wherein the plate body is arranged on an end of a cell stack of a fuel cell in a direction in which cells are stacked;
   a fastening portion extending along edges of the plate body and fastened to a case that contains the cell stack; and
   ribs arranged in a grid-like manner in a region of the plate body surrounded by the fastening portion, wherein
      the ribs are arranged so that recesses defined between the ribs each have a quadrilateral shape in a cross-sectional plan view in which two diagonals have different lengths,
      the ribs are arranged so that the recesses extend in a direction in which the ribs extend,
      the ribs are arranged so that a longer one of the two diagonals of each of the recesses extends parallel to the short sides of the plate body,
      wherein each of the diagonals joins two opposite corners of the corresponding quadrilateral shape.

2. The end plate according to claim 1, wherein each recess includes an open end with an obtuse edge so that the recess widens as a distance from a bottom of the recess becomes longer.

3. The end plate according to claim 1, wherein
   the recesses each include wall surfaces, and
   adjacent ones of the wall surfaces are connected by a curved surface that is curved in an arcuate manner.

4. The end plate according to claim 1, wherein
   the recesses each include wall surfaces and a bottom surface, and
   each of the wall surfaces is connected to the bottom surface by a curved surface that is curved in an arcuate manner.

* * * * *